(12) United States Patent
Wachi et al.

(10) Patent No.: US 7,089,730 B2
(45) Date of Patent: Aug. 15, 2006

(54) EXHAUST GAS PURIFICATION METHOD FOR INTERNAL COMBUSTION ENGINE

(75) Inventors: Satoshi Wachi, Tokyo (JP); Hiromichi Hisato, Hyogo (JP); Li Liu, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 141 days.

(21) Appl. No.: 10/330,135

(22) Filed: Dec. 30, 2002

(65) Prior Publication Data

US 2003/0126859 A1 Jul. 10, 2003

(30) Foreign Application Priority Data

Jan. 8, 2002 (JP) ............... 2002-001262

(51) Int. Cl.
*F01N 3/00* (2006.01)
(52) U.S. Cl. ............... 60/285; 60/274; 60/277; 60/301; 60/276
(58) Field of Classification Search ............... 60/274, 60/276, 277, 285, 286, 295, 297, 301
See application file for complete search history.

(56) References Cited

U.S. PATENT DOCUMENTS

| | | | | |
|---|---|---|---|---|
| 5,437,153 A | * | 8/1995 | Takeshima et al. | 60/285 |
| 5,595,060 A | * | 1/1997 | Togai et al. | 60/274 |
| 5,715,679 A | * | 2/1998 | Asanuma et al. | 60/285 |
| 5,743,084 A | * | 4/1998 | Hepburn | 60/276 |
| 6,105,365 A | * | 8/2000 | Deeba et al. | 60/274 |
| 6,119,449 A | * | 9/2000 | Köhler | 60/285 |
| 6,263,666 B1 | * | 7/2001 | Kubo et al. | 60/295 |
| 6,499,291 B1 | * | 12/2002 | Lang et al. | 60/277 |
| 6,499,293 B1 | * | 12/2002 | Surnilla et al. | 60/285 |

FOREIGN PATENT DOCUMENTS

| | | |
|---|---|---|
| DE | 198 23 210 A1 | 12/1998 |
| DE | 199 44 694 A1 | 8/2000 |
| DE | 199 22 981 A1 | 11/2000 |
| DE | 100 27 738 A1 | 2/2001 |
| DE | 100 38 227 A1 | 2/2001 |
| DE | 696 09 857 T2 | 3/2001 |
| DE | 100 30 064 A1 | 4/2001 |
| DE | 101 04 729 A1 | 9/2001 |
| JP | 2586739 | 12/1996 |
| JP | 2600492 | 1/1997 |

* cited by examiner

*Primary Examiner*—Tu M. Nguyen
(74) *Attorney, Agent, or Firm*—Sughrue Mion, PLLC (57) ABSTRACT

To obtain an exhaust gas purification method for an internal combustion engine for detecting timing at which an inflow NOx amount flowing into an NOx absorption catalyst exceeds an NOx amount processable by the NOx absorption catalyst, and enriches the air/fuel ratio to prevent deterioration of the exhaust gas and maintain good fuel consumption. Based on an NOx amount absorbed in the NOx absorption catalyst and a maximum NOx absorption amount NOx of the absorption catalyst, a processable NOx amount processable by the NOx absorption catalyst per unit time is calculated and compared with the inflow NOx amount entering the NOx absorption catalyst per unit time, and when it is determined that the inflow NOx amount is greater, the air/fuel ratio is switched to rich.

11 Claims, 5 Drawing Sheets

PRIOR ART

CASE WHERE INFLOW NOx AMOUNT IS GREAT

CASE WHERE INFLOW NOx AMOUNT IS SMALL

EXHAUST GAS PURIFICATION METHOD FOR INTERNAL COMBUSTION ENGINE

BACKGROUND OF THE INVENTION

1. Field of the Invention

The present invention relates to an exhaust gas purification method for an internal combustion engine using an NOx absorption catalyst, and more particularly to an exhaust gas purification method for an internal combustion engine for preventing deterioration of exhaust gas, and achieving good fuel consumption while sufficiently securing lean operation time.

2. Description of the Related Art

Generally, in operation control of an internal combustion engine, improvement of fuel consumption is an objective and an air/fuel ratio is controlled to maintain a lean ratio. In order to reduce NOx that is released, an NOx absorption catalyst is used.

Further, in the NOx absorption catalyst, an absorption function (NOx reducing function) suffers when an NOx absorption amount exceeds an amount permissible by the NOx absorption catalyst. Therefore, in order to maintain the absorption function, it is necessary to periodically release and reduce the NOx that has been absorbed.

Therefore, conventionally, in an exhaust gas purification system using an NOx absorption catalyst, the NOx released during the lean operation state (over-oxygenated state) of the internal combustion engine is absorbed into the NOx absorption catalyst, and at every predetermined cycle, the operation state of the internal combustion engine is switched to a rich operation state, and the NOx absorbed in the NOx absorption catalyst is released and the NOx is simultaneously reduced.

This type of exhaust gas purification method for an internal combustion engine can be referenced in JP 2600492 B, for example.

In this way, in the exhaust gas purification method using the NOx absorption catalyst, in order to release the NOx form the NOx absorption catalyst to reduce the NOx, it is important to appropriately control the timing of the switching from the lean operation to the rich operation.

In the above method disclosed in JP 2586739 B, etc., for example, an NOx amount already absorbed in the NOx absorption catalyst is estimated, and in a case where it is determined that the estimated absorption NOx amount is greater than a predetermined permitted amount, the operation state of the internal combustion engine is switched from lean to rich.

Figure 6:
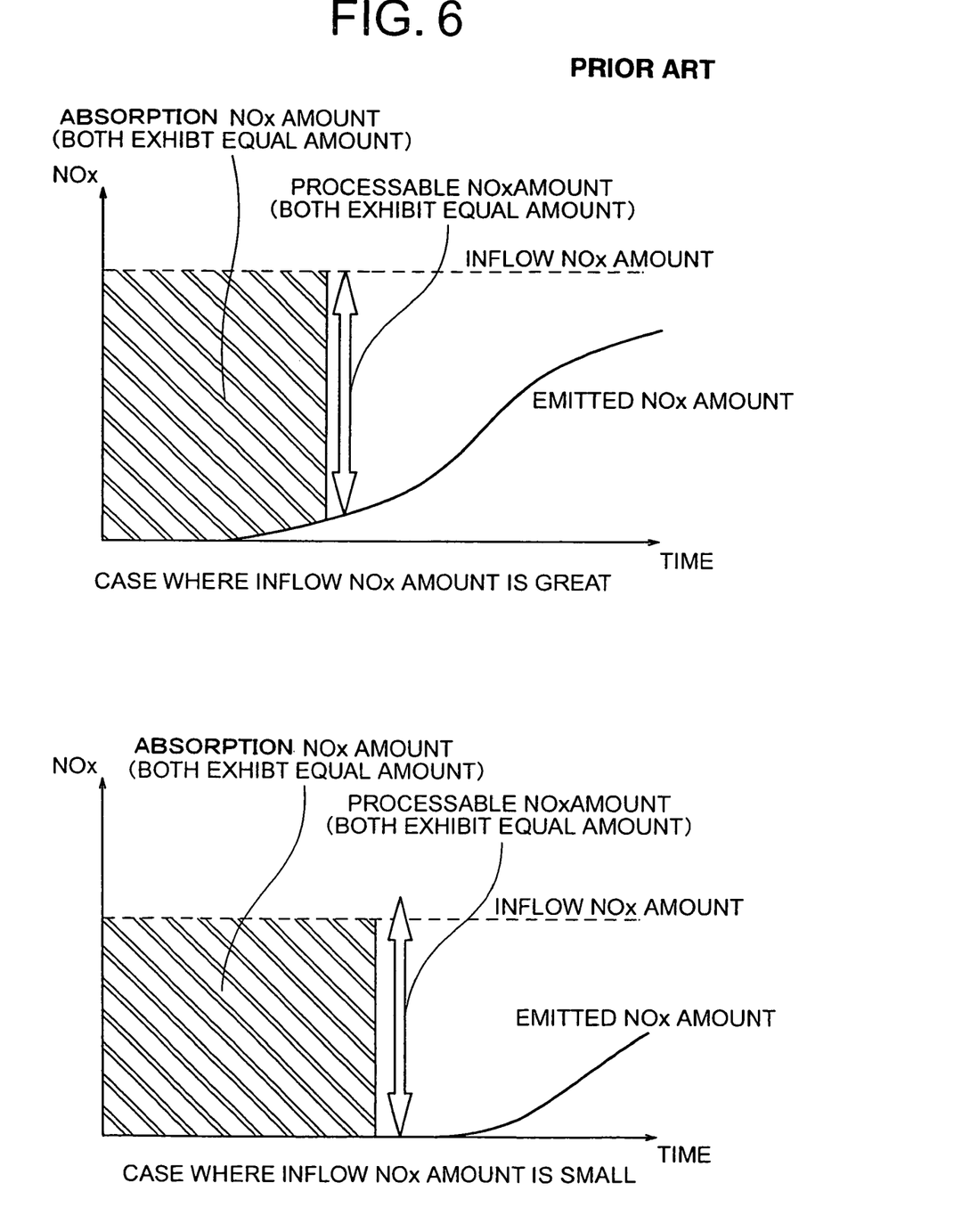
FIG. 6 is an explanatory diagram showing NOx emission properties in cases of different inflow NOx amounts entering an NOx absorption catalyst 7, according to a conventional exhaust gas purification method for an internal combustion engine.

FIG. 6 is an explanatory diagram showing an exhaust gas purification states according to the conventional method. The diagram shows released NOx amounts according to the amount of an inflow NOx amount flowing into the NOx absorption catalyst.

In FIG. 6, a horizontal axis represents time, a vertical axis represents the NOx amount (inflow amount and emission amount), a diagonal line region represents the NOx amount absorbed in the NOx absorption catalyst, and a white arrow represents the NOx amount that can be processed by the NOx absorption catalyst. Cases where the inflow NOx amount (see the broken line) is great (top), and is small (bottom), are shown for comparison.

As is clear from FIG. 6, even when the estimated absorption NOx amount (see the diagonal line portion), if the inflow NOx amount (see broken line) is great, a portion of the inflow NOx amount flows out (is released) to a downstream of the NOx absorption catalyst. By contrast, in the case where the inflow NOx amount is small, the NOx absorption capability (see the white arrow) still has a margin, so it is understood that the lean operation may be continued.

This shows that even when the estimated absorption NOx amount is the same as the NOx amount processable by the absorption catalyst, if the inflow NOx amount is small, the entire NOx amount is processed and does not leak downstream. By contrast, in the case where the inflow NOx amount is great, the inflow NOx amount cannot be completely processed, and thus flows out downstream.

In other words, according to the method such as the conventional method, in which the operation state is switched from lean to rich in the case where it is determined that the NOx amount inside the NOx absorption catalyst exceeds the permitted amount, when the inflow NOx amount entering the NOx absorption catalyst changes, it is difficult to switch the operation state from lean to rich at appropriate timing, and this can adversely instigate exhaust gas deterioration or decrease the benefits of fuel consumption and the like.

As described above, in the conventional internal combustion engine exhaust gas purification method, the operating state was switched from lean to rich based only on the estimated/calculated absorption NOx amount, without considering the inflow NOx amount going into the NOx absorption catalyst. Therefore, the operating state can not be switched from lean to rich at appropriate timing, and thus there was a problem of causing exhaust gas deterioration, and reduction of benefits of fuel consumption.

SUMMARY OF THE INVENTION

The present invention has been made to solve the above-mentioned problems, and therefore has as an object to provide an internal combustion engine exhaust gas purification method which pays attention to an NOx amount that is processable by an NOx absorption catalyst, compares the processable NOx amount against an inflow NOx amount flowing into the NOx absorption catalyst, and switches an air/fuel ratio from lean to rich according to the comparison results, to thereby prevent deterioration of the exhaust gas and also achieve good fuel consumption while sufficiently securing lean operation time.

According to the present invention, there is provided an internal combustion engine exhaust gas purification method for changing an oxygen concentration in exhaust gas flowing into an NOx absorption catalyst provided inside an exhaust passage of an internal combustion engine, making the NOx absorption catalyst absorb the NOx under a first oxygen concentration condition in which the oxygen concentration in the exhaust gas becomes excessive, and releasing and simultaneously reducing the NOx from the NOx absorption catalyst under a second oxygen concentration condition in which the oxygen concentration in the exhaust gas declines, the exhaust gas purification method including: a first step for, under the first oxygen concentration condition, calculating an inflow NOx amount flowing into the NOx absorption catalyst per unit time, and a processable NOx amount that can be processed by the NOx absorption catalyst per unit time; a second step for comparing the inflow NOx amount and the processable NOx amount calculated in the first step; and a third step for reducing the oxygen concentration in the exhaust gas flowing into the NOx absorption catalyst in a case where it was determined in the second step that the inflow NOx amount is greater than the processable NOx amount.

DETAILED DESCRIPTION OF THE PREFERRED EMBODIMENTS

Embodiment 1

Hereinafter, detailed description is made of Embodiment 1 of the present invention, with reference to the drawings.

Figure 1:
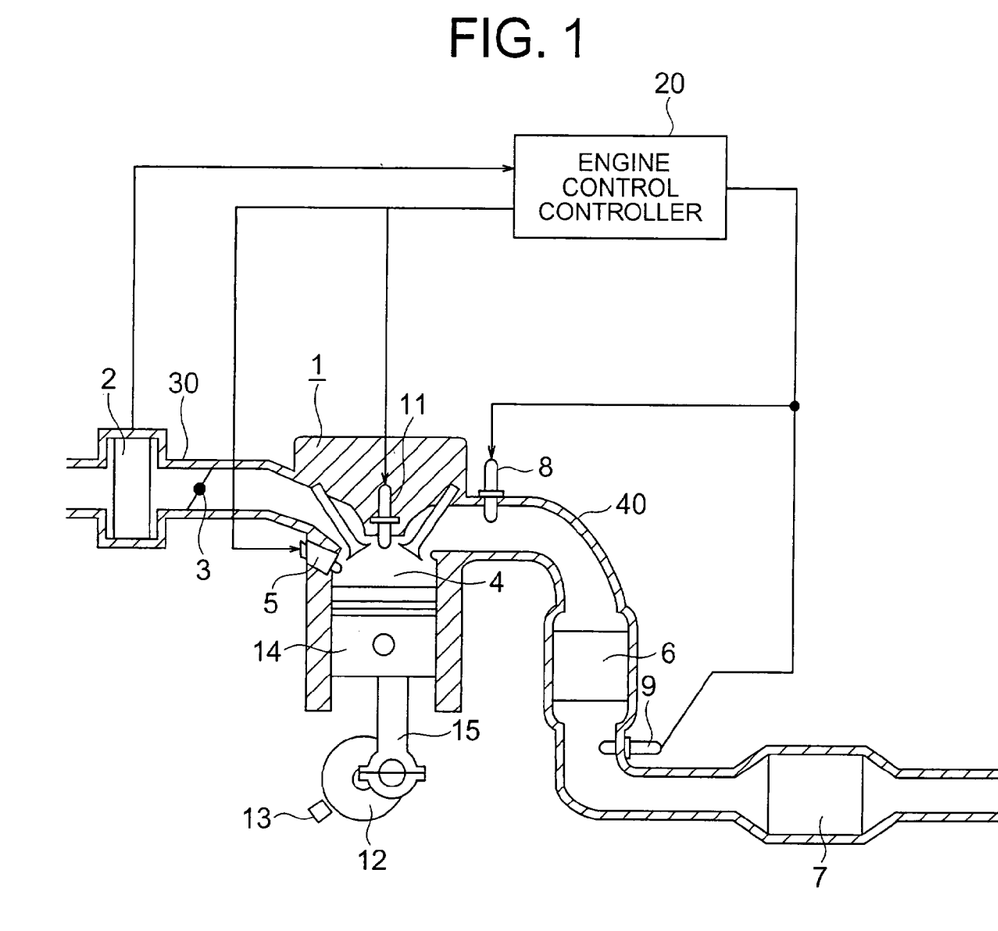
FIG. 1 is a block construction diagram showing an exhaust gas purification device for an internal combustion engine to which Embodiment 1 of the present invention is employed.

FIG. 1 is a block construction diagram showing an entire system of an exhaust gas purification device for an internal combustion engine, to which Embodiment 1 of the present invention is applied.

In FIG. 1, an internal combustion engine (engine) 1 is illustrated using one cylinder in a fuel control device of a multi-cylinder internal combustion engine.

An inlet pipe 30 communicated with to the internal combustion engine 1 is provided with an intake air amount sensor 2 for measuring an air amount being sucked into the internal combustion engine 1, and a throttle valve 3 for controlling the air amount being sucked into the internal combustion engine 1.

An intake air flow rate measured by the intake air amount sensor 2 is introduced into a combustion chamber 4 of the internal combustion engine 1 and mixed with fuel gas provided from a fuel injection injector 5 into an air/fuel mixture, and then is ignited by a spark plug 11 and combusted.

The cylinder with the combustion chamber 4 is provided with a piston 14 which operates up and down, which rotates a crankshaft 12 through a connecting rod 15.

A crank angle sensor 13 mounted in the vicinity of the crankshaft 12 detects the rpm of the internal combustion engine 1.

On the other hand, the combustion chamber 4 of the internal combustion engine 1 is communicated with an exhaust pipe 40, and the exhaust pipe 40 is provided with three-way catalyst 6 and an NOx absorption catalyst 7 for purifying the exhaust gas.

On the upstream side of the three-way catalyst 6, there is provided an air/fuel ratio sensor 8 for detecting a air/fuel ratio in the exhaust gas, and on the downstream side of the three-way catalyst 6, there is provided an exhaust gas temperature sensor 9.

An engine control controller 20 is constituted by a microcomputer unit. The engine control controller 20 takes in signals (operating state information) from various sensors including the intake air amount sensor 2, the air/fuel ratio sensor 8, the exhaust gas temperature sensor 9 and the crank angle sensor 13. Based on these signals, the engine control controller 20 drives the fuel injection injector 5, the spark plug 11 and the like.

The NOx absorption catalyst 7 may use alumina, for example, as a carrier, and may be constituted by bearing on the carrier, for example, noble metals such as Pt (platinum) together with at least one metal selected from the group consisting of: alkali metals such as K (potassium), Na (sodium), Li (lithium) and Cs (cesium); alkali earth metals such as Ba (barium) and Ca (calcium); and rare earth metals such as La (lanthanum) and Y (yttrium)

The NOx absorption catalyst 7 constituted as described above absorbs NOx at a time when the exhaust gas flowing therein has an excessively high concentration of oxygen, and releases NOx while simultaneously reducing it when the concentration of oxygen in the exhaust gas declines.

Further, although not shown in FIG. 1, the throttle valve 3 may also be provided with a throttle actuator which is driven under control of the engine control controller 20.

Next, description will be made of exhaust gas purification processing operations according to Embodiment 1 of the present invention, making reference to FIG. 1 and to a flow chart in FIG. 2.

Figure 2:
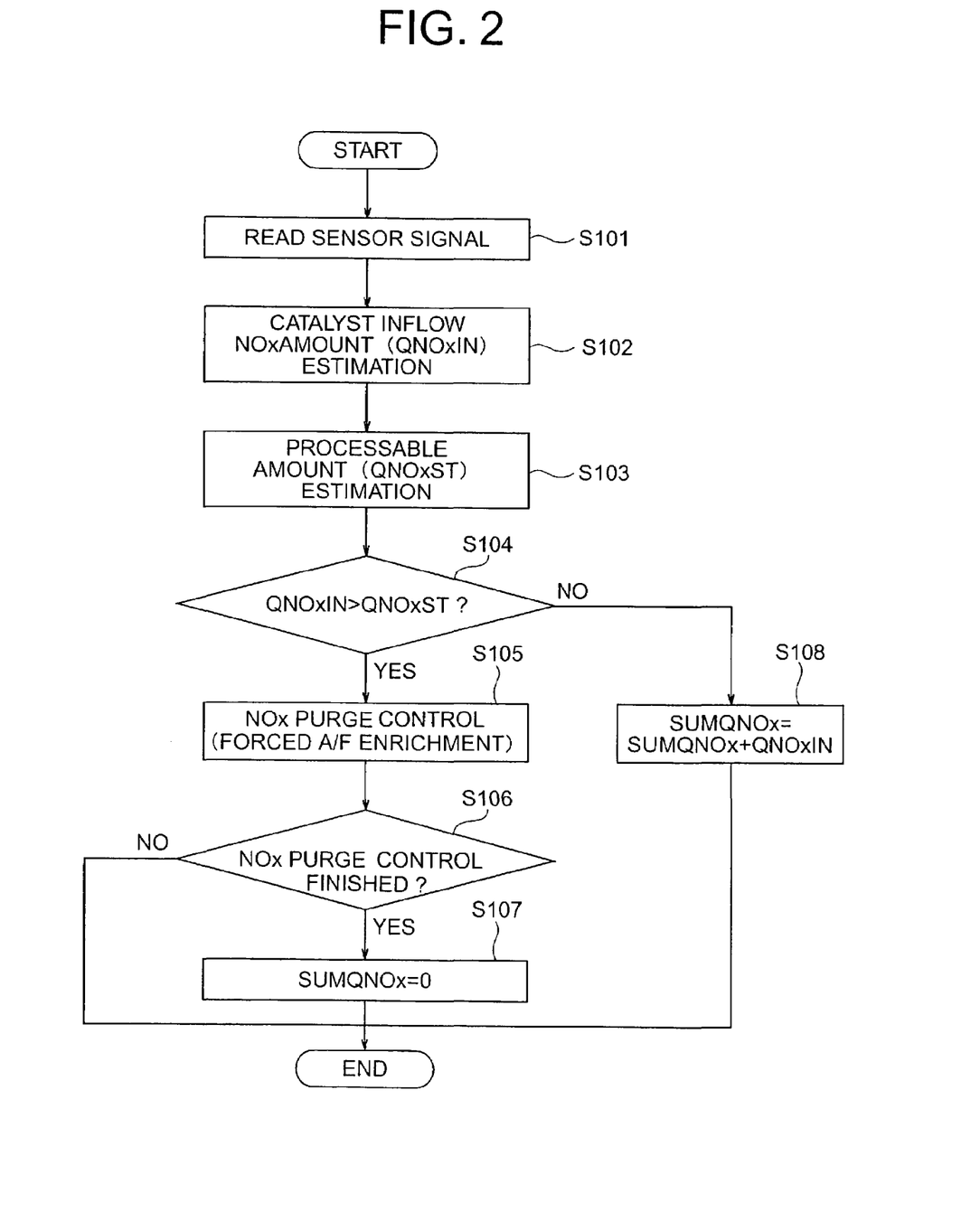
FIG. 2 is a flowchart showing processing operations according to Embodiment 1 of the present invention.

The flow chart in FIG. 2 shows a process for forcibly enriching the air/fuel ratio when the internal combustion engine 1 is operating to decrease the oxygen concentration in the exhaust gas in order to release and reduce the NOx that was absorbed in the NOx absorption catalyst 7 when the internal combustion engine 1 was operating in a lean state.

The processing routine shown in FIG. 2 is repeatedly executed at every predetermined cycle (for example, every 10 msec as the predetermined cycle) and predetermined crank angle (every 180° as the crank angle).

In FIG. 2, first, the signals from the various sensors are read (step S101), and based on the various sensor signals read at step S101, an inflow NOx amount (QNOxIN) flowing into the NOx absorption catalyst 7 is estimated (step S102).

In this case, examples of methods for the estimation/calculation of the inflow NOx amount (QNOxIN) include a method of compensating the data values read from a multi-dimensional MAP in which the operational states (e.g., engine rpm, engine load, etc) of the internal combustion engine 1 are used as the parameters of the MAP, using an exhaust gas air/fuel ratio A/F.

Next, based on the various sensor signals read at step S101, the NOx amount (SUMQNOx described below) estimated as being absorbed inside the NOx absorption catalyst 7 and the like, the current NOx amount (QNOxST) processable by the NOx absorption catalyst 7 is estimated (step S103).

Note that, the estimation calculation processing for obtaining the processable NOx amount (QNOxST) will be described in detail below with reference to flowcharts in FIG. 3 and FIG. 4.

Next, the inflow NOx amount (QNOxIN) into the NOx absorption catalyst 7, and the processable NOx amount (QNOxST) in the NOx absorption catalyst 7, which are estimated at step S102 and step S103, are compared with each other to determine whether or not QNOxIN>QNOxST (step S104).

In other words, at step S104, in order to release/reduce the NOx accumulated inside the NOx absorption catalyst 7, a determination is performed to determine whether or not to switch the air/fuel ratio to "rich" (i.e., whether or not to execute an NOx purge control).

Specifically, at step S104, in a case where it is determined that the inflow NOx amount (QNOxIN) is greater than the processable NOx amount (QNOxST) (i.e., if YES), it means that if the lean operation continues, then a part of the inflow NOx amount (QNOxIN) will not be processed by the NOx absorption catalyst 7 and will be released into the atmosphere.

Therefore in the case where QNOxIN>QNOxST, the NOx purge control (steps S105 to S107) is executed, and the NOx absorbed in the NOx absorption catalyst 7 until this point is reduced and reduced.

On the other hand, at step S104, if it is determined that QNOxIN≦QNOxST (i.e., if NO), this means that even if the lean operation continues as it is, the inflow NOx amount (QNOxIN) into the NOx absorption catalyst 7 can be processed sufficiently.

Therefore, in the case where QNOxIN≦QNOxST, the lean operation by the internal combustion engine 1 is continued, and the inflow NOx amount (QNOxIN) of this time is added to the NOx amount (SUMQNOx) estimated to be absorbed in the NOx absorption catalyst 7, and the sum (SUMQNOx+QNOxIN) is stored as a new SUMQNOx (step S108).

Accordingly, the NOx amount estimated to be absorbed inside the NOx absorption catalyst 7 is updated and calculated, and the processing routine in FIG. 2 ends.

On the other hand, in the NOx purge control processing at steps S105 to S107, first, the engine is operated in the pre-set rich A/F operation state, and the emission, reduction of the NOx absorbed in the NOx absorption catalyst 7 are performed simultaneously (step S105).

Next, a determination as to whether the NOx purge control has ended is performed (step S106), a determination as to whether the NOx absorbed in the NOx absorption catalyst 7 has been sufficiently released is performed, and a determination as to whether or not the NOx purge control should be continued is performed.

Specifically, the NOx amount (SUMQNOx) estimated to be absorbed during the lean operation of the internal combustion engine 1, and the amounts of reductants (HC and CO amounts) provided during the NOx purge control are compared with each other, and if they are equivalent to each other in stoichiometry, then it is determined that the NOx inside the NOx absorption catalyst 7 has been sufficiently released and reduced.

At step S106, if it is determined that the NOx purge control has ended (i.e., if YES), then the estimated absorption NOx amount (SUMQNOx) is reset to zero (step S107), and the processing routine in FIG. 2 ends.

On the other hand, at step S106, if it is determined that the NOx purge control has not ended (i.e., if NO), then step S107 is skipped and the processing routine in FIG. 2 ends immediately.

Next, description will be made of operations of estimation processing of the processable NOx amount (QNOxST) in the NOx absorption catalyst 7, according to Embodiment 1 of the present invention, with reference to the flowchart in FIG. 3.

First, based on the signal from the exhaust gas temperature sensor 9, which has been read at step S101 in FIG. 2, a temperature (TCAT) of the NOx absorption catalyst 7 is estimated (step S201).

Next, a compensation coefficient for determining a maximum NOx absorption amount according a degree of deterioration of the NOx absorption catalyst 7 is read out, and a deterioration degree Crekka of the NOx absorption catalyst 7 is estimated/calculated (step S202).

For performing the estimation/calculation of the NOx absorption catalyst 7 deterioration degree, there have been disclosed various publicly known methods such as can be seen in JP 2836522 B, for example. These publicly known methods may be used to estimate the deterioration degree.

Next, the catalyst temperature TCAT and the deterioration compensation coefficient Crekka obtained at steps S201 and S202, respectively, are used to calculate the maximum NOx absorption amount (QNOxMAX) of the NOx absorption catalyst 7 (step S203).

Specifically, the maximum absorption amount MAP data, which has been determined in advance according to catalyst temperatures for example, are referenced. Then, the maximum absorption amount obtained from the MAP data is multiplied by the compensation coefficient (Crekka) corresponding to the deterioration degree, to thus calculate the maximum NOx absorption amount (QNOxMAX).

Next, the absorption NOx amount (SUMQNOx) estimated in the processing in FIG. 2 is referenced. Then, by calculating the ratio of the absorption NOx amount (SUMQNOx) to the maximum NOx absorption amount (QNOxMAX) (i.e., SUMQNOx/QNOxMAX), an absorption rate (P_NOxST) is calculated (step S204).

Subsequently, the absorption rate P_NOxST is used to estimate the current processable NOx amount (QNOxST) per unit time (step S205).

Specifically, the MAP data using absorption rates P_NOxST as parameters are prepared in advance, and this MAP data is referenced to thus estimate the current processable NOx amount (QNOxST).

Figure 4:
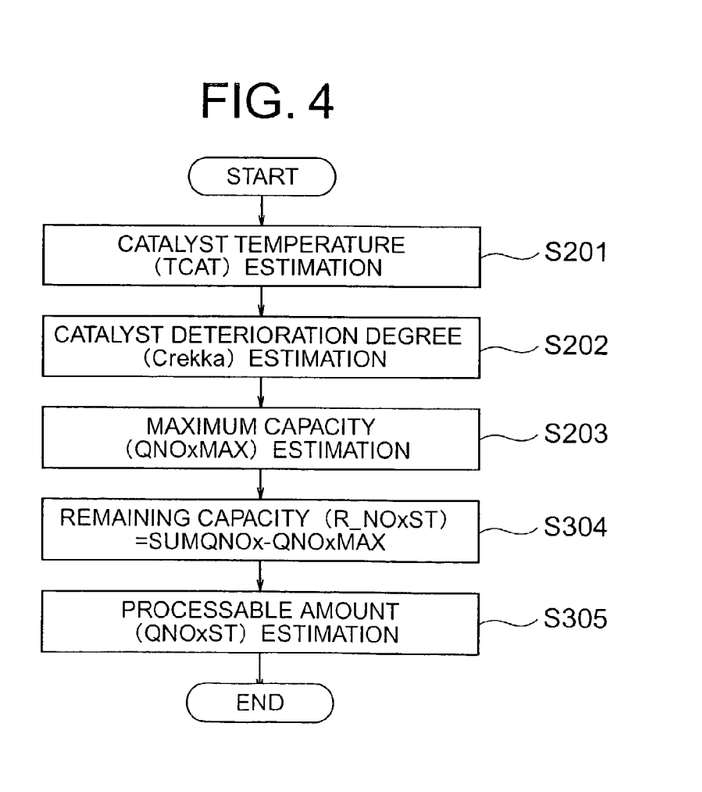
FIG. 4 is a flowchart showing another example of the estimation/calculation operation of the processable NOx amount according to Embodiment 1 of the present invention.

Further, as a method of estimating the NOx amount (QNOxST) that can be processed by the NOx absorption catalyst 7, it is possible to use the method shown in the flowchart in FIG. 4.

In the processing routine in FIG. 4, steps S204 and 205 described above (see FIG. 3) are modified to steps S304 and 305, respectively.

Figure 3:
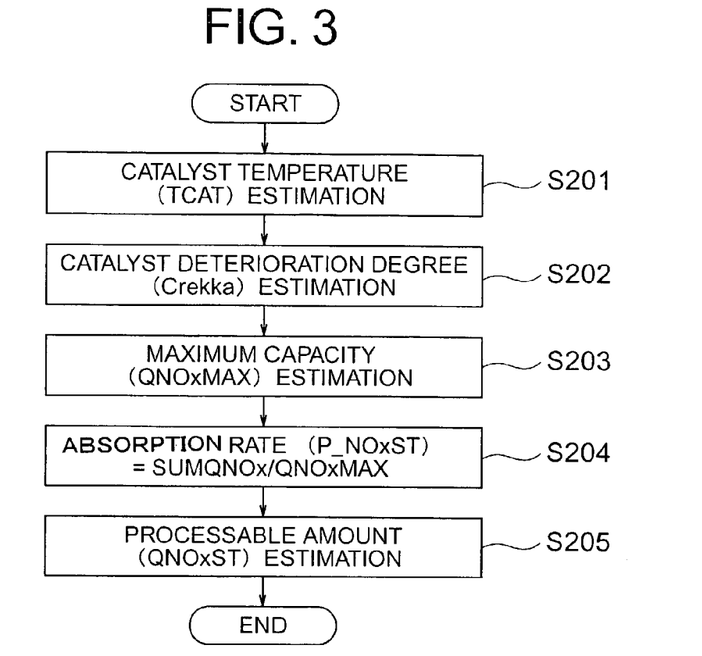
FIG. 3 is a flowchart showing an example of an estimation/calculation operation of a processable NOx amount according to Embodiment 1 of the present invention.

Specifically, at step S304, instead of obtaining the absorption rate P_NOxST at step S204 in FIG. 3, the absorption NOx amount (SUMQNOx) is subtracted from the maximum NOx absorption amount (QNOxMAX), to thereby obtain the remaining capacity (R_NOxST) of the NOx absorption catalyst 7.

Further, at step S305, MAP data using the remaining processable capacity (R_NOxST) as parameters of the MAP are referenced to estimate the current processable NOx amount (QNOxST).

By performing processing as in FIG. 3 or FIG. 4, it is possible to estimate the NOx amount (QNOxST)processable by the NOx absorption catalyst 7.

Therefore, timing for executing the NOx purge control can be determined according to the result of the comparison with the inflow NOx amount (QNOxIN) going into the NOx absorption catalyst 7 (see step S104 in FIG. 2).

As a result, it becomes possible to secure a lean operation region to maintain good fuel consumption while purifying the exhaust gas well.

Further, the timing for reducing the oxygen concentration in the exhaust gas flowing into the NOx absorption catalyst 7 can be modified according to the deterioration degree of the NOx absorption catalyst 7. Therefore, even in the case where the NOx absorption catalyst 7 has deteriorated, it is possible to control deterioration of the exhaust gas while securing sufficient lean operation running time.

Embodiment 2

Note that, in Embodiment 1 above, in the comparison/determination step S104, only the relative sizes of the inflow NOx amount (QNOxIN) and the processable NOx amount (QNOxST) where compared. However, it is also possible to determine whether or not the inflow NOx amount (QNOxIN) is greater than the processable NOx amount (QNOxST) by an amount equal to or greater than the predetermined value.

Hereinbelow, description will be made of an internal combustion engine exhaust gas purification method according to Embodiment 2 of the present invention in which a predetermined value for making the comparison/determination has been set, with reference to the flowchart in FIG. 5.

In the case described below, the system construction is the same as described above (see FIG. 1), so that description thereof is omitted.

Figure 5:
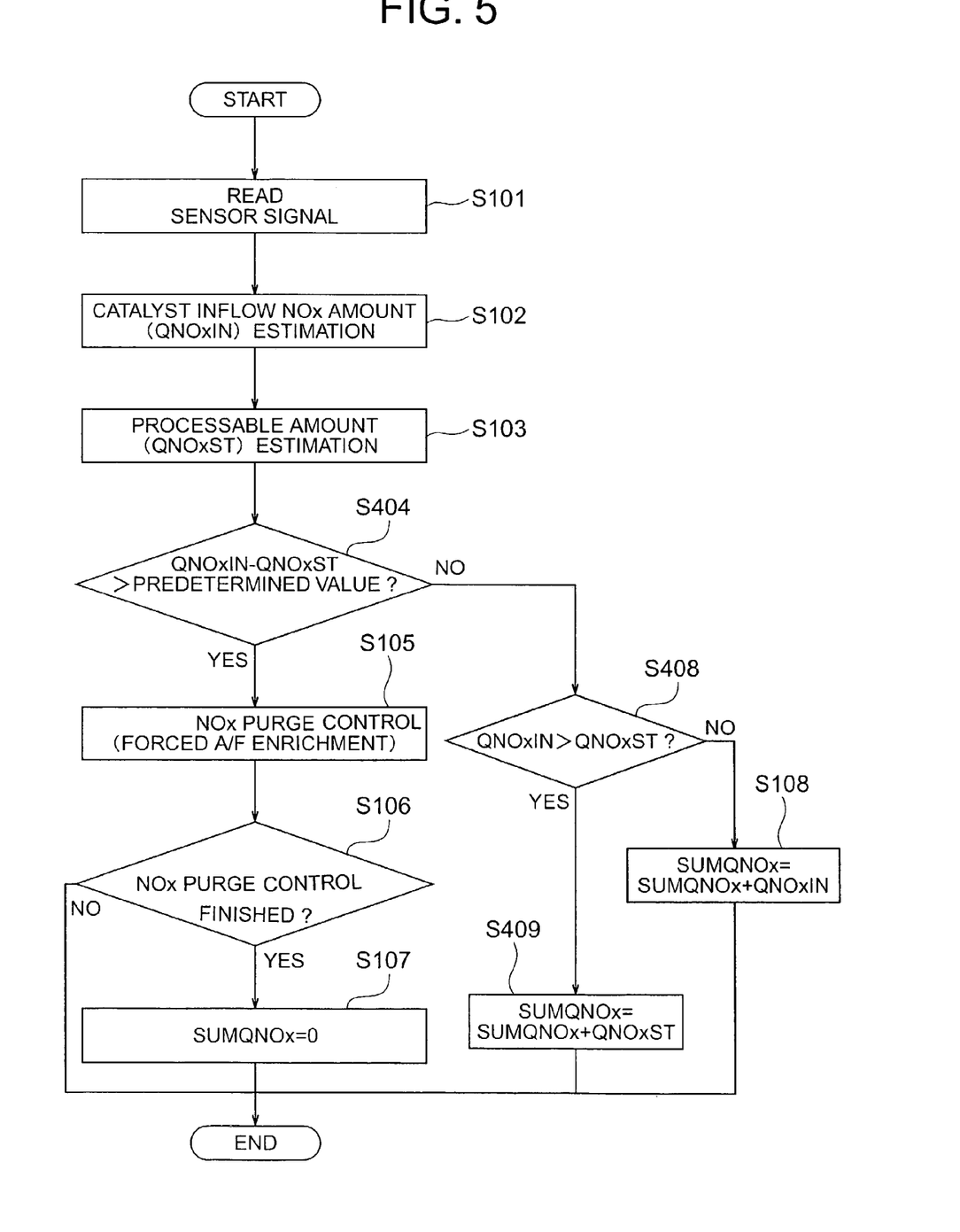
FIG. 5 is a flowchart showing a processing operation according to Embodiment 2 of the present invention.

In the flowchart in FIG. 5, only a portion of the above-mentioned (FIG. 2) flowchart has been changed. Common processing steps are indicated with the same symbols as described above, and detailed description thereof is omitted.

FIG. 5 is different from FIG. 2 only in that the determination step S104, where it is determined whether or not to switch the air/fuel ratio to a "rich" ratio (i.e., whether or not to execute the NOx purge control), is changed to step S404, and steps S408 and S409 relating to the absorption NOx amount (SUMQNOx) updating step S108 are added.

In FIG. 5, first, as described above, at steps S102 and S103, the inflow NOx amount (QNOxIN) and the processable NOx amount (QNOxST) are estimated/calculated.

Next, in order to determine whether or not to switch the air/fuel ratio to rich to release/reduce the NOx collected inside the NOx absorption catalyst 7 (i.e., whether or not to execute the NOx purge control), the estimated inflow NOx amount (QNOxIN) and the processable NOx amount (QNOxST) are compared with each other, and then it is determined whether or not a deviation between the two (i.e., QNOxIN−QNOxST) is greater than the predetermined value (step S404).

In step S404, if it is determined that (QNOxIN−QNOxST) >predetermined value (i.e., if YES), then this is a state where, if the lean operation is continued as it is, the NOx released to the atmosphere without being sufficiently processed will increase. Therefore, the processing advances to step S105 and the NOx purge control is executed, and the NOx absorbed in the NOx absorption catalyst 7 until that time is released to thus execute the purification.

On the other hand, at step S404, if it is determined that (QNOxIN−QNOxST)≦predetermined value (i.e., NO), then this is a state where, even if the lean operation is continued as it is, the inflow NOx amount entering the NOx absorption catalyst 7 can be sufficiently processed. Therefore, the lean operation is continued.

In this case, first, the calculation of the NOx amount (SUMQNOx) estimated as being absorbed inside the NOx absorption catalyst 7 is performed, and the inflow NOx amount (QNOxIN) flowing into the NOx absorption catalyst 7 and the NOx amount (QNOxST) processable by the NOx absorption catalyst 7 are compared with each other to determine whether or not QNOxIN>QNOxST (step S408).

At step S408, if it is determined that QNOxIN>QNOxST (i.e., if YES), then the processable NOx amount (QNOxST) is added to the absorption NOx amount (SUMQNOx) (step S409), and the processing routine in FIG. 5 ends.

This indicates that the NOx absorption catalyst 7 cannot absorb the entire inflow NOx amount (QNOxIN) and that only the processable NOx amount (QNOxST) is being absorbed, and that the remainder is leaking downstream.

However, at step S404 it has already been confirmed that the difference between the inflow NOx amount (QNOxIN) and the processable NOx amount (QNOxST) is equal to or less than the predetermined value. Therefore, the exhaust gas does not deteriorate significantly.

On the other hand, at step S408, if it is determined that QNOxIN≦QNOxST (i.e., if NO), then the procedure advances to step S108 above, where the inflow NOx amount (QNOxIN) is added to the absorption NOx amount (SUMQNOx), and then the processing routine in FIG. 5 ends.

This indicates that the NOx absorption catalyst 7 is able to absorb the entire inflow NOx amount (QNOxIN), and that NOx is not leaking downstream.

According to the above-mentioned processing, as described above, while suppressing deterioration of the exhaust gas, the lean operation region can be secured to the maximum limit. Thus, the exhaust gas performance and the fuel consumption performance can both be maintained.

Note that, the above-mentioned predetermined value used at step S404 may, for example, be read out from the MAP data corresponding to the engine rpm and the engine load to thereby set the optimum value for each operating region, so that a better effect can be expected.

Further, by setting the predetermined value at "0", it becomes possible to perform a similar processing operation to that of Embodiment 1 described above.

Further, in Embodiment 2 described above, the exhaust gas temperature sensor 9 was used to measure the exhaust temperature, the catalyst temperature was estimated from the exhaust temperature, and the maximum NOx absorption amount (QNOxMAX) was calculated based on the estimated catalyst temperature. However, the exhaust temperature may also be estimated from the MAP data corresponding to the engine rpm and the engine load, for example.

Further, it goes without saying that the same effect can be obtained also by directly reading out the maximum NOx absorption amount (QNOxMAX) from the MAP data corresponding to the engine rpm and the engine load.

What is claimed is:

1. An internal combustion engine exhaust gas purification method for changing an oxygen concentration in exhaust gas flowing into an NOx absorption catalyst provided inside an exhaust passage of an internal combustion engine, making the NOx absorption catalyst absorb the NOx under a first oxygen concentration condition in which the oxygen concentration in the exhaust gas becomes excessive, and releasing and simultaneously reducing the NOx from the NOx absorption catalyst under a second oxygen concentration condition in which the oxygen concentration in the exhaust gas declines, the exhaust gas purification method comprising:

a first step for, under the first oxygen concentration condition, calculating an inflow NOx amount flowing into the NOx absorption catalyst per unit time, and a processable NOx amount that can be processed by the NOx absorption catalyst per unit time;

a second step for comparing the inflow NOx amount and the processable NOx amount calculated in the first step; and a third step for reducing the oxygen concentration in the exhaust gas flowing into the NOx absorption catalyst in a case where it was determined in the second step that the inflow NOx amount is greater than the processable NOx amount.

2. An internal combustion engine exhaust gas purification method according to claim 1, wherein the second oxygen concentration condition is set by switching the internal combustion engine from a lean operating condition to a rich operating condition.

3. An internal combustion engine exhaust gas purification method according to claim 1, wherein at the second step, when the inflow NOx amount is greater than the processable NOx amount by an amount equal to or greater than a predetermined value, it is determined that the inflow NOx amount is greater than the processable NOx amount.

4. An internal combustion engine exhaust gas purification method according to claim 3, wherein the predetermined value is zero.

5. An internal combustion engine exhaust gas purification method according to claim 3, wherein the predetermined value is set variably according to an operating condition of the internal combustion engine.

6. An internal combustion engine exhaust gas purification method according to claim 1, wherein in the first step, the processable NOx amount is calculated based on an NOx amount absorbed inside the NOx absorption catalyst and a maximum NOx absorption amount that can be absorbed in the NOx absorption catalyst.

7. An internal combustion engine exhaust gas purification method according to claim 6, wherein in the first step, the processable NOx amount is calculated based on a ratio between the NOx amount absorbed in the NOx absorption catalyst and the maximum NOx absorption amount that can be absorbed in the NOx absorption catalyst.

8. An internal combustion engine exhaust gas purification method according to claim 6, wherein in the first step, the processable NOx amount is calculated based on a difference between the NOx amount absorbed in the NOx absorption catalyst and the maximum NOx absorption amount that can be absorbed in the NOx absorption catalyst.

9. An internal combustion engine exhaust gas purification method according to claim 6, wherein in the first step, the lesser of the calculated inflow NOx amount and the processable NOx amount is integrated to estimate the NOx amount absorbed inside the NOx absorption catalyst.

10. An internal combustion engine exhaust gas purification method according to claim 6, wherein at the first step, the maximum NOx absorption amount is calculated according to a temperature of the NOx absorption catalyst.

11. An internal combustion engine exhaust gas purification method according to claim 10, wherein the first step includes a step for estimating a deterioration degree of the NOx absorption catalyst, and calculating the maximum NOx absorption amount according to the estimated deterioration degree.

* * * * *